United States Patent [19]

de Nora et al.

[11] 4,108,756

[45] Aug. 22, 1978

[54] BIPOLAR ELECTRODE CONSTRUCTION

[75] Inventors: Oronzio de Nora, Milan; Vittorio de Nora, Nassau, The Bahamas; Placido M. Spaziante, Milan, Italy

[73] Assignee: Oronzio de Nora Impianti Electtrochimici S.p.A., Milan, Italy

[21] Appl. No.: 745,403

[22] Filed: Nov. 26, 1976

Related U.S. Application Data

[62] Division of Ser. No. 514,762, Oct. 15, 1974, Pat. No. 4,032,426.

[30] Foreign Application Priority Data

Oct. 30, 1973 [IT] Italy ................................ 30709 A/73

[51] Int. Cl.² ............................................ C25B 11/00
[52] U.S. Cl. ................................... 204/286; 204/268; 204/297 R; 204/95

[58] Field of Search ................................ 204/254–256, 204/268, 280, 286, 297 R

[56] References Cited

U.S. PATENT DOCUMENTS

| 832,983 | 10/1906 | Kother | 204/268 |
| 3,402,117 | 9/1968 | Evans | 204/268 |
| 3,410,784 | 11/1968 | Maunsell et al. | 204/268 |
| 3,766,044 | 10/1973 | Westerlund | 204/268 |
| 3,849,281 | 11/1974 | Bennet et al. | 204/268 |

*Primary Examiner*—T. Tung
*Attorney, Agent, or Firm*—Hammond & Littell

[57] ABSTRACT

Novel vertical multiunit electrolyzers with bipolar metallic electrodes for the electrolysis of halide containing electrolytes to produce oxidized halogen compounds and to a novel electrolysis of electrolytes which is designed to produce a gas lift effect to sweep solid deposits off the electrodes and out of the electrolyzer.

4 Claims, 13 Drawing Figures

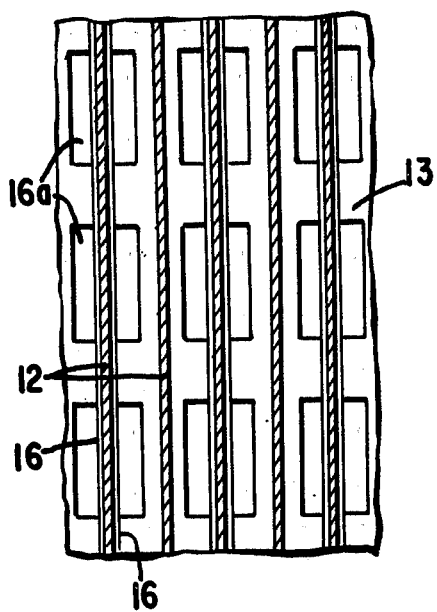
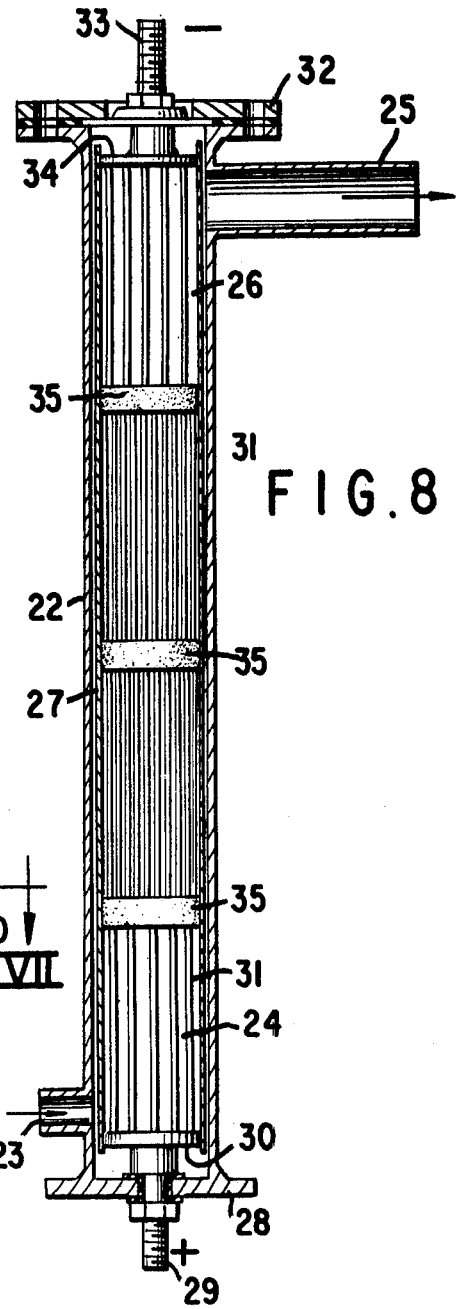
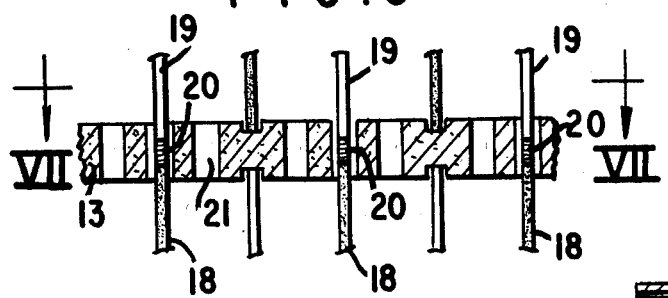
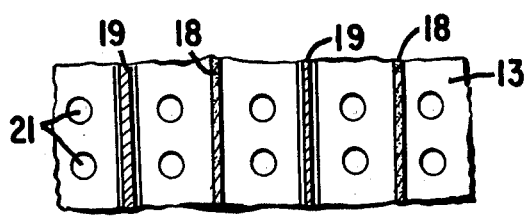

BIPOLAR ELECTRODE CONSTRUCTION

PRIOR APPLICATION

This application is a division of our copending, commonly assigned U.S. patent application Ser. No. 514,762 filed Oct. 15, 1974, now U.S. Pat. No. 4,032,426.

STATE OF THE ART

The use of active chlorine or alkali metal hypochlorites for the sterilization of drinking water has become wide spread. It has also been used to prevent growth of bacteria flora and for treatment of biological secretions, for preventing the accumulation of algae and to oxidize organic matter in swimming pools and in industrial cooling water systems. For these purposes, the concentration of the free chlorine is of the order of 1 to 2 mg per liter and the commerical processes have been using commerically bottled chlorine. However, the use of chlorine raises technical problems in accurate dosing thereof and creates safety hazards due to the high toxicity of gaseous chlorine which makes transporting and storage of chlorine undesirable, so much so that some municipalities have strict laws against its transportation through congested areas.

To avoid the problems caused by the use of liquid or gaseous chlorine, alkali metal hypochlorites have been used at concentrations of 100 to 180 g per 1 of active chlorine but this material also has storage, transporation and dosing problems. The use of alkali metal hypochlorites requires the transportation and storage of large quantities of liquid which tends to lose its active chlorine, particularly in summer months when there is a greater necessity to sterilize water and this makes accurate dosing difficult. Also, in some cases, the alkalinity associated with the hypochlorite solution is noxious to the final use of the treated water.

A prior art vertical electrolysis cell for the production of active chlorine from brine is described in U.S. Pat. No. 3,766,044 in FIG. 5 of the patent which is designed for the production of chlorate in which the anodes and cathodes are welded to the plates which divide the individual units. However, the individual units must be bolted together which increases construction costs and increases assembly problems, the anodes and cathodes are not supported at each end, the conduction of current through the apparatus is poor, the use of recirculation spaces around the side of the cell and the anode-cathode plate assemblies prevents successful utilization of gas lifting effect to sweep reaction products and preciptates out of the apparatus, and there is retention of the electrolyte and by-products of the electrolysis in each individual cell unit because of recirculation spaces.

OBJECTS OF THE INVENTION

It is an object of the invention to provide a vertical bipolar electrolyzer which takes up a minimum of space and has increased efficiency due to the utilization of a gas lift effect occurring in the electrolyte during electrolysis to sweep the electrolysis product and precipitates out of the apparatus to prevent fouling thereof.

It is another object of the invention to provide novel bipolar elements useful in vertical electrolyzers having a plurality of units.

Another object of the invention is to provide bipolar anodes and cathodes supported at each end and with direct connection between the anode portion and the cathode portion to provide better current conduction through a plurality of units.

It is a further object of the invention to provide a novel method of electrolysis of electrolytes in a vertical electrolyzer.

These and other objects and advantages of the invention will become obvious from the following detailed description.

THE INVENTION

The novel vertical electrolyzer of this invention comprises a vertical housing provided with a lower electrolyte inlet means, an upper electrolyte outlet means, a plurality of non-conductive divider elements disposed in the housing having a cross-section substantially equal to the housing cross-section to form a plurality of cell units, a plurality of bipolar electrodes passing through said divider elements and being evenly spaced about the divider cross-section with the anode portion and cathode portion extending the same distance from the divider elements, means in the divider element allowing passage of the electrolyte from one cell unit to the next higher cell unit and means for impressing an electric current on the cell. Preferably, the divider elements are provided with means such as blind grooves or slots for aligning and maintaining the alignment of the cathode and anode portions of the electrode above and below it.

The vertical housing for the electrolysis cell may be made of any suitable material such as steel, other metals or plastic such as polyvinyl chloride and is usually provided with an insulating inert material lining to prevent loss of current through the container and to avoid corrosion problems. The cross-section of the housing may be any suitable shape such as square, rectangular or circular. In one embodiment, the electrolyzer may be inserted into a pipe in an electrolyte circuit.

The divider elements are made of a non-conducting, electrolyte inert material such as ceramic materials or inert plastics and the cross-section thereof is substantially the same as that of the vertical housing so that there is no movement of the elements, no movement of the anodes and cathodes in the elements and no leakage of electrolyte around them. The said divider elements are provided with a plurality of holes equally distributed about their cross-section in which the bipolar electrodes may be secured.

The divider elements also have equally distributed about their cross-section a plurality of blind holes or slots on each side thereof to accommodate the end of the anode portion and cathode portion of the bipolar electrode from the elements in the dividers above and below the divider. This permits easy assembly and alignment of the cathodes and anodes in each cell unit so they are uniformly spaced from each other The divider elements are constructed so that the electrolyte may flow smoothly from one cell unit to the next unit. This may be effected by providing a plurality of holes or slots through the divider plate or by the use of hollow bipolar electrodes with holes just above and below the divider element or by providing holes for the bipolar electrodes through the divider elements which are large enough to allow electrolyte to pass therethrough.

The bipolar electrodes may be made of various materials depending upon the specific electrolyte and the electrolysis product formed. The electrodes may be made of a single resistant metal such as a valve metal like titanium or tantalum or a platinum group metal and may be bimetallic with the anode portion being made of one metal such as titanium and the cathode portion made of a second metal such as steel, stainless steel, copper, silver, etc. which is suited to cathodic conditions. The anode and cathode portions may be in direct contact with each other or they may be connected by an intermediate metal.

The anode portion of the bipolar electrodes are preferably made of a valve metal provided with an electroconductive, electrocatalytic coating on the exterior thereof capable of conducting electricity to the electrolyte for extended periods of time without passivating and the cathode portions may be of the same metal without an electrocatalytic coating thereon.

Examples of suitable anodic coatings are platinum group metal such as platnium, palladium, iridium, ruthenium, osmium or rhodium and alloys thereof; gold silver, iron, nickel, chromium, copper, lead and manganese and oxides, nitrides, sulfides and carbides thereof and mixtures thereof. Most suitable are coatings of a valve metal oxide and a non-film forming conductor as described in U.S. Pat. No. 3,632,498.

If the bipolar electrode is bimetallic, there is sometimes difficulty in welding the two metals together and this can be overcome by providing a third metal between the anode and cathode portions which is more easily welded to the two metals. For example, if the anode portion is made of titanium and the cathode portion is made of steel, a copper insert is provided which is easily welded at one end to the steel and at the opposite end to the titanium.

The intermediate metal in a bimetallic electrode of this construction can also perform the function of preventing migration of hydrogen atoms across the cathode to the anode portion. Migrating hydrogen atoms diffusing to the anode can cause blistering and swelling of the support metal which causes destruction of the electrocatalytic coating thereon. When copper is used between titanium and steel, the copper acts as a barrier to the diffusion of hydrogen to the anode.

The vertical housing of the electrolyzer is provided with inlet and outlet means at the bottom and top thereof, respectively and in the preferred embodiment, this consists of chambers at either end to provide a turbulence subsiding space at the inlet end and to avoid inducing turbulence in the lost electrolysis unit.

Due to the vertical construction of the electrolyzer of the invention, the flow of the electrolyte is essentially straight and turbulence in the cell units is avoided. This straight flow of the electrolyte through the space between adjacent anodes and cathodes forming the electrolysis gap reduces the accumulation of insoluble particles which may precipitate in the cells, particularly a problem when sea water is being electrolyzed. The solids are carried out of the cell by this electrolyte flow and the speed of the electrolyte is increased from the inlet to the outlet by utilizing the gas lifting effect of the gases formed in the electrolysis.

The hydrogen bubbles formed during the electrolysis do not have the opportunity to stagnate in the cell units and to form gas pockets because of the straight forward flow of the electrolyte. Instead, the hydrogen bubbles are dispersed throughout the electrolyte and increase in concentration as the electrolyte rises through the vertical cell, thus increasing the speed of the electrolyte in the upper sections of the electrolyzer. Thus, this invention makes use of the lift effect of the gases formed and results in an increase in electrolyte speed as it rises through the various cell units. The uniformity of the flow across the entire section of the electrolyzer, the progressive increase of the speed of the electrolyte gas dispersion rising through the electrolyzer and the absence of turbulence induced internal recirculation paths or stagnant zones prevent the settling of solid particles such as precipitates of calcium and magnesium, organic matter etc. inside the electrolyzer. These solid particles are maintained in suspension and are effectively swept away by the flow of the electrolyte gas dispersion.

Referring now to the drawings which illustrate preferred embodiments of the invention:

FIG. 5 is a plan sectional view of FIG. 4 taken along line V—V of FIG. 4.

FIG. 6 is an enlarged cross-sectional view of another form of divider element and the arrangement of bimetallic, bipolar electrodes.

FIG. 7 is a plan sectional view of FIG. 6 taken approximately along lines VII—VII of FIG. 6.

FIG. 8 is a cross-sectional view of an embodiment of a vertical electrolyzer of the invention with rod bipolar electrodes and a circular cross-section.

Figure 1:
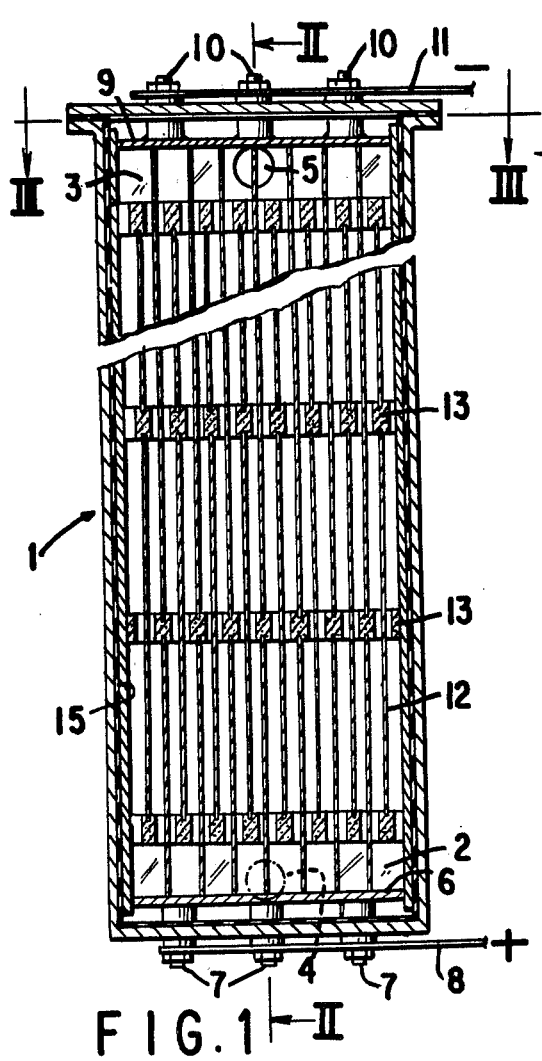
FIG. 1 is a partial cross-sectional view of a vertical electrolyzer of the invention with plate-like bipolar electrodes.
Figure 2:
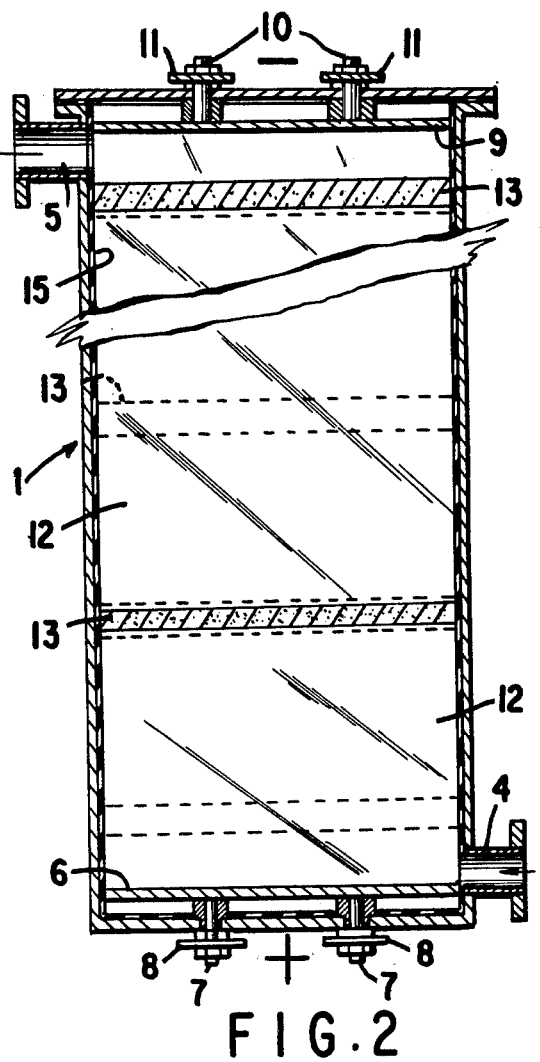
FIG. 2 is a partial cross-sectional view of FIG. 1 taken along the line II—II.
Figure 3:
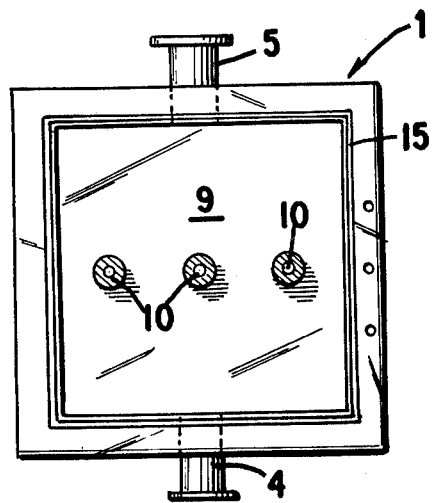
FIG. 3 is a plan sectional view of the electrolyzer of FIG. 1 taken along line III—III.

Referring now to the embodiment of the electrolyzer illustrated in FIGS. 1 to 4, this electrolyzer consists of a housing 1 which is provided with inlet chamber 2 and outlet chamber 3. The electrolyte is fed into the inlet chamber 2 by means of pipe 4 and is removed from the electrolyzer by pipe 5 which may be connected to a gas-liquid separation vessel, if desired. The electrolyzer with only two complete and portion of other chambers are illustrated in FIG. 1. It will be understood that any number of electrolyzer chambers may be provided in housing and that this housing 1 may be elongated to accommodate as many electrolyzer chambers or cell units as desired. The electrolyzer is provided with a positive terminal plate 6 connected to the proper pole of the electrical energy supply means (not shown) by terminals 7 and bus bar 8 and is provided with a negative terminal plate 9 connected by terminals 10 and supply bar 11 to the energy supply source.

The anode plates 6a in the lowest cell unit are in contact with positive terminal plate 6 and the cathode cathode plates 9a in the upper most cell unit are in contact with the negative terminal plate 9. Any number of intermediate cell units may be interposed between the terminal positive end unit and the terminal negative end unit and the flow of electric current can be from bottom to top or vice versa. No electrolysis takes place in the inlet and outlet compartments 2 and 3 since only electrodes of a single type are present in these compartments.

Figure 4:
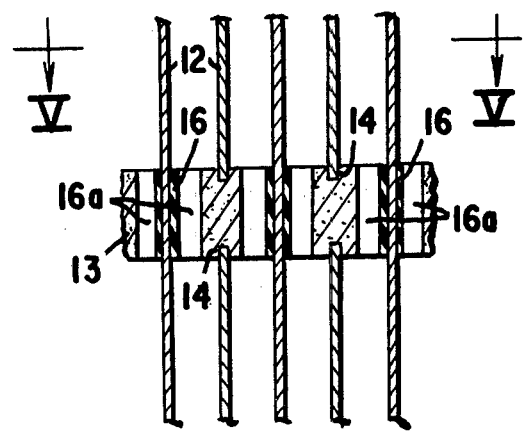
FIG. 4 is an enlarged cross-sectional view of a divider element and the arrangement of the bipolar electrodes made of a single metal.

The bipolar electrodes 12 in the electrolyzer of FIG. 1 are separated at their midpoint by a plurality of divider elements 13 made of an insulating material such as polyvinyl chloride, plexiglas, ebonite, rubber, ceramic material and the like which may be provided with gaskets 16 between the divider elements and the electrodes. The divider elements 13 and electrodes 12 act as horizontal walls defining individual cell units. The bipolar electrodes of FIG. 1 are shown as metallic plates and the divider elements above and below the bipolar electrodes are provided with grooves 14 to accommodate the ends of the electrode and provide simple automatic spacing and mechanical sturdiness of the electrodes in a cell unit. Some of the electrodes extend through the divider elements 13 as shown in FIG. 4 and some of the electrodes terminate in and are held in place by the grooves 14. The interior of the cell housing 1 is provided with an insulating chamber of insulating housing 15 to insulate the electrolyzer units from the cell housing. The divider elements 13 are provided with slots 16a (FIG. 5) which permits a smooth flow of electrolyte upwardly through the electrolyzer.

The electrolysis current is passed from positive plate 6 to the positive ends of bipolar electrodes 12 then through the divider elements 13 to the negative ends of the bipolar electrodes in the first cell unit, through the electrolyte contained therein to the positive end of the next set of bipolar electrodes and up through the cell in the same fashion until the current reaches the negative terminal plate 9.

As illustrated in FIG. 1 the leads from the bottom terminal plate 6 are connected to electrodes which pass through the lowest divider element and extend into grooves 14 in the bottom of the next higher divider element. The electrodes 12 which rest in the grooves 14 in the lowest divider element pass through holes in the next higher divider element and into the next higher cell unit etc. throughout the cell height until the top terminal unit is reach. In this unit the electrodes extend through the divider element and are connected to the top terminal plate 9, thus completing the bipolar connections through the cell regardless of the number of cell units in the cell.

The sodium chloride solution passing through the cell units connected in series is electrolyzed according to the following reactions:

Cathode reaction: $2H_2O \rightarrow H_2 + 2OH^- 2e^-$ with diffusion of $OH^-$ ions toward the anode Anode reactions: $2Cl^- \rightarrow Cl_2 \uparrow + 2e^- Cl_2 + 2OH^- \rightarrow Cl^- + ClO^- + H_2O$ Net reaction of anode: $Cl^- + 2OH^- + ClO^- + H_2O + 2e^-$ The hydrogen bubbles generated at the cathode and any other free gases are carried upward by the electrolyte and cause the electrolyte speed to increase as it passes through each higher cell unit as the amount of hydrogen increases from unit to unit. The density of the electrolyte decreases as the hydrogen bubble-concentration increases and this aids in reducing the formation of and sweeping away undesired deposits.

The metallic bipolar electrodes may be in the form of metal plates, expanded metal, metal mesh, etc. or of strips of metal or in the form of rods. The electrodes may be made of a valve metal such as titanium, tantalum, zirconium, niobium, molybdenum, tungsten, etc. or alloys thereof or silicon-iron alloys. The anodic portion is covered with an electro-conductive, electrocatalytic coating.

In the embodiment of FIGS. 6 and 7, the bipolar electrodes 12 are bimetallic in which the anodic portion 18 is made of a suitable valve metal based provided with a coating of electroconductive, electrocatalytic material and the cathodic portion 19 is made of a different metallic material suited to cathodic conditions such as steel, copper, silver, stainless steel, etc. To overcome the problems of welding different materials, a thin insert 20 of a suitable third material such as copper is provided which is then welded to the end of the valve metal anodic portion 18 and the cathodic portion 19. The insert 20 also acts to prevent hydrogen migration from the cathodic portion 19 to the anodic portion 18. Gaskets 16 are provided in this embodiment to seal the area around the inserts 20 to prevent the corrosion of insert 20 by the electrolyte and the electrolysis products. In the embodiment of FIGS. 6 and 7, the divider element 13 is provided with circular holes 21 rather than slots to permit upward passage of the electrolyte therethrough.

Figure 9:
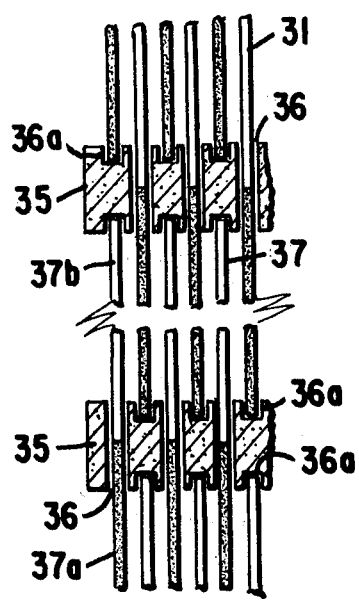
FIG. 9 is an enlarged partial cross-section of two divider elements and bipolar rods of the electrolyzer of FIG. 8.
Figure 10:
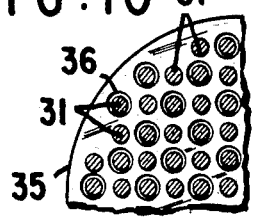
FIG. 10 is a partial plan view of the divider elements of FIG. 9 taken along line X—X of FIG. 9.

In the embodiment of FIG. 8 to 10, the electrolyzer is in the form of a circular pipe with the bipolar electrodes in the form of metallic rods. The electrolyzer consists of housing 22 provided with inlet nozzle 23 leading to inlet chamber 24 and outlet nozzle 25 communicating with neutral outlet chamber 26. The housing may be made of any suitable material such as polyvinyl chloride and is provided with an inert insulating material in the form of sleeve 27.

The lower end of the housing 22 is closed by a plate 28 through which positive terminal 29 passes for connection to the energy source. Preferably, the plate 28 is welded to the housing but it may be secured by any suitable means such as by bolting. Terminal 29 is connected to end plate 30 which forms a liquid tight seal with sleeve 27. To ensure a good electrical contact between base plate 30 and the bipolar electrodes 31 when the electrolyzer is assembled, holes may be drilled in end plate 30 and the rods 31 in the assembled cell are inserted into these holes and welded thereto and the back plate is then welded to terminal 29.

The upper end of housing 22 is closed by plate 32 which is preferably removably secured to housing 22 to permit access to the cell for maintenance. Terminal 33 passes through plate 32 and is electrically connected to end plate 34 which together with sleeve 27 forms a liquid-tight top and bipolar electrodes 31 are secured to plate 34 in the same fashion as to plate 30.

The embodiment of FIGS. 8 to 10 as well as the embodiment of FIGS. 1 to 6 may have any number of active electrolysis chambers and although only two active electrolysis chambers or cells have been shown in FIG. 8, it will be understood that any desired number of electrolysis chambers or cells may be provided in the same electrolyzer housing.

The electrolyzer of FIGS. 8 to 10 is characterized by a bottom electrically neutral inlet chamber 24 and a top electrically neutral outlet chamber 26 which contribute to equal flow distribution of the electrolyte through the entire electrolyzer. The electrolyte is fed into the lower inlet chamber 24 and passes into the chamber immediately above through holes or grooves in the divider elements which divide the electrolyzer into a plurality of electrolysis cell units. The electrolyte flow is therefore, longitudinally parallel to the electrodes and the hydorgen bubbles formed do not have an opportunity to stagnate and form gas pockets. There is no recirculation space in the individual cell units. Instead, the hydrogen bubbles are dispersed in the electrolyte and flow upwardly therewith so that in this way, the lift effect of the hydrogen bubbles is used to increase the speed of the electrolyte from cell unit to cell unit to produce processively higher flow rates in the cells from the bottom to the top. The electrolyzer of FIGS. 8 to 10 is divided, as in FIG. 1, by a plurality of divider elements 35 which fit closely in sleeve 27 to form a plurality of cell units which can be held in place by screws, if necessary.

As shown in FIGS. 9 and 10, the bipolar electrodes 37 are made of a single metal such as titanium and the anode portion 37a is provided with an electrocatalytic coating while the cathode portion 37b remains uncoated. The divider element 35 in this embodiment is provided with a plurality of holes 36 evenly spaced over its surface through which the bipolar electrode rods pass while leaving a space around each rod through which the electrolyte can pass from one cell unit to the next unit. The divider element 35 is also provided with a plurality of blind holes 36a on both horizontal sides which are evenly spaced to accommodate the ends of the electrodes 31 passing through the holes of the divider element of the cell unit next above and below the divider element. This provides a simple means for spacing the anode and cathode portions of the bipolar rod electrodes so that there is a uniform electrolytic gap between each anode and cathode and bipolar conduction from cell unit to cell unit.

Figure 11:
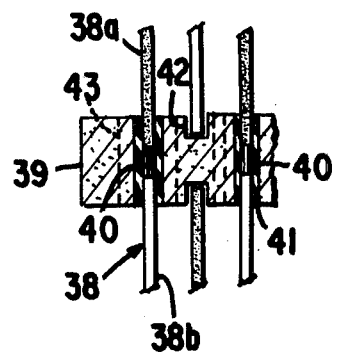
FIGS. 11 and 12 are an enlarged partial cross-section and partial plan view, respectively, of a divider element of the invention with bimetallic bipolar electrodes.
Figure 12:
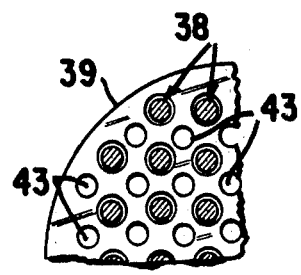

In the modification of FIGS. 11 and 12, the bipolar rod electrodes 38 are bimetallic and are securely mounted in divider element 39 and therefore screws are not necessary to hold divider element 39 in position. The anode portion 38a of rod electrode 38 is made of a suitable material such as titanium with a coating of an electroconductive, electrocatalytic coating and a cathode portion 38b made of a suitable material such as iron or steel. To facilitate connection of the two portions, a copper connector strip 40 is welded at one end to the cathode end 38b and at the other end to the anode end 38a. The holes 41 through the divider element through which the bipolar electrodes pass are sealed against pentration by the electrolyte in order to protect the strip 40 from the corrosive conditions in the cell. This may be any suitable heat resistant gasket material such as a resin.

Divider element 39 is provided with a plurality of blind holes 42 to accommodate the ends of rods electrodes 38 as before and is further provided with a plurality of holes 43 to permit the easy straight flow of the electrolyte from one cell unit to the next.

The electrolyzers FIGS. 1 to 12 are useful for the electrolysis of dilute brines such as sea water, to form oxidizing compounds of chlorine such as hypochlorite and may also be used to form chlorates and perchlorates from aqueous chloride solutions. When sea water is electrolyzed, the normal impurities such as calcium, magnesium, potassium, etc. and algae are precipitated and normally deposit on and foul the electrodes. However, by making use of the gas lifting effect of the hydrogen bubbles and other gases, the electrolyte is caused to flow more rapidly through each successive higher cell unit to sweep the electrolyte and any precipitated solids therein through each successive higher unit to reduce the deposition of solids in the units and retard any fouling effect.

A typical set of operating data of the electrolyzers used to generate active chlorine in the form of hypochlorite to chlorinate sea-water to be used as a cooling medium in large industrail complexes is as follows:

| Electrolyte | Untreated sea-water |
|---|---|
| NACL Concentration | 20 GPL as chlorine |
| Electrolyte inlet temperature | 24° C |
| Electrolyte outlet temperature | 26° C |
| Electrolyte retention time | 15 secs. |
| Average electrolyte speed | 11 cm/sec |
| Electrode spacing | 3.75 mm |
| Current density | 1600 A/m$^2$ |
| Active chlorine concentration in the effluent | 2 GPL |
| Current efficiency | 95% |
| Chlorate content in the effluent | Undetected |

A similar illustrative set of operating data for a chlorate test installation is reported herebelow:

| Electrolyte composition at the steady conditions reached during the test | 100 to 110 GPL of NACL 650 to 670 GPL of chlorate |
|---|---|
| Buffering agent concentration | 3 GPL of $Na_2CR_2O_7.H_2O$ |
| Electrolyte inlet temperature | 95° C |
| Electrolyte outlet temperature | 98° C |
| Average electrolyte speed between electrodes | 40 cm/sec |
| Electrode spacing | 3.5 mm |
| Current density | 2250 A/m$^2$ |
| Current efficiency | 98% |
| Hypochlorite concentration in the effluent | 2 GPL |
| Retention time in the reactor | 90 secs. |
| Retention time in the cell | 3 secs. |

For the purposes of this test, the electrolyzer was connected to a reactor tank and the electrolyte was recycled from the tank to the electrolyzer. Steady concentrations of chlorate and chlorine in the electrolyte were obtained by continuously withdrawing electrolyte and feeding make-up brine into the reactor tank. Circulation of the electrolyte from electrolyzer to the reactor tank and back was provided solely by the lift effect of the hydrogen gas bubbles inside the electrolyzer.

Figure 13:
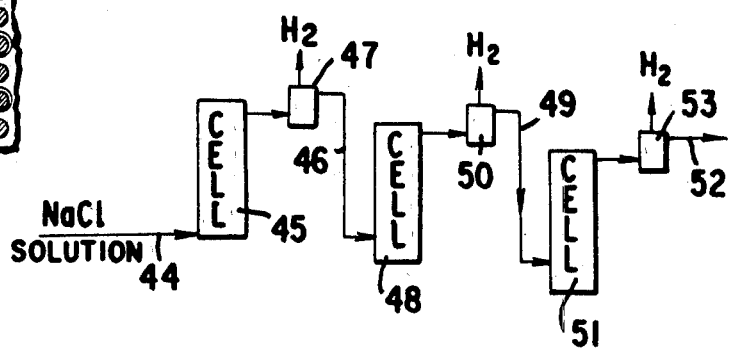
FIG. 13 is a schematic representation of an electrolyzer system useful for producing sodium chlorate from a sodium chloride solution.

When chlorates are produced, higher temperature are used and construction materials suitable for higher temperature are used but the cell design remains essentially as shown. However, for chlorate production it is preferred to provide a series of separate interconnected electrolyzers with the electrolyte passing in series through each of the electrolyzers. FIG. 13 illustrates one system used for the production of sodium chlorate in which the aqueous sodium chloride solution is introduced by feed line 44 into electrolyzer 45 which preferably has 5 electrolysis cell units therein. The electrolyte is removed from cell 45 by line 46 and is passed through a gas-liquid separation vessel 47 to vent the hydrogen gas in the electrolyte and into the bottom of electrolyzer 48. The electrolyte is removed therefrom by line 49 through liquid-gas separator 50 and then through electrolyzer 51. The resulting chlorate solution is removed by line 52 and passed to gas-liquid separator 53 and recovered.

Various other modifications of the apparatus and the electrolyzing methods of the invention may be made without departing from the spirit or scope thereof and it is to be understood that the invention is intended to be limited only as defined in the appended claims.

We claim:

1. A bipolar element for vertical electrolyzers comprising an electrically non-conductive, electrolyte inert divider element with a cross-section adapted to the cross-section of the electrolyzer, a plurality of bipolar electrodes passing through said divider element and evenly distributed over the divider element cross-section with the anode portion and cathode portion extending the same distance from the horizontal surfaces of the divider element and means in said divider for allowing smooth upward flow of the electrolyte therethrough.

2. The bipolar element of claim 1 wherein the horizontal surfaces of the divider element are provided with means for accommodating the ends of the bipolar electrodes passing through the divider elements above and below to provide simple uniform facing of the electrodes.

3. The bipolar element of claim 1 wherein the bipolar electrodes are in the form of rods.

4. The bipolar element of claim 3 wherein the rods are made of a single metal and the anode portion has an electroconductive, electrocatalytic coating over at least a portion thereof.

* * * * *